(No Model.)
W. S. WELSH.
STOVE PIPE HOLDER.
No. 387,837. Patented Aug. 14, 1888.
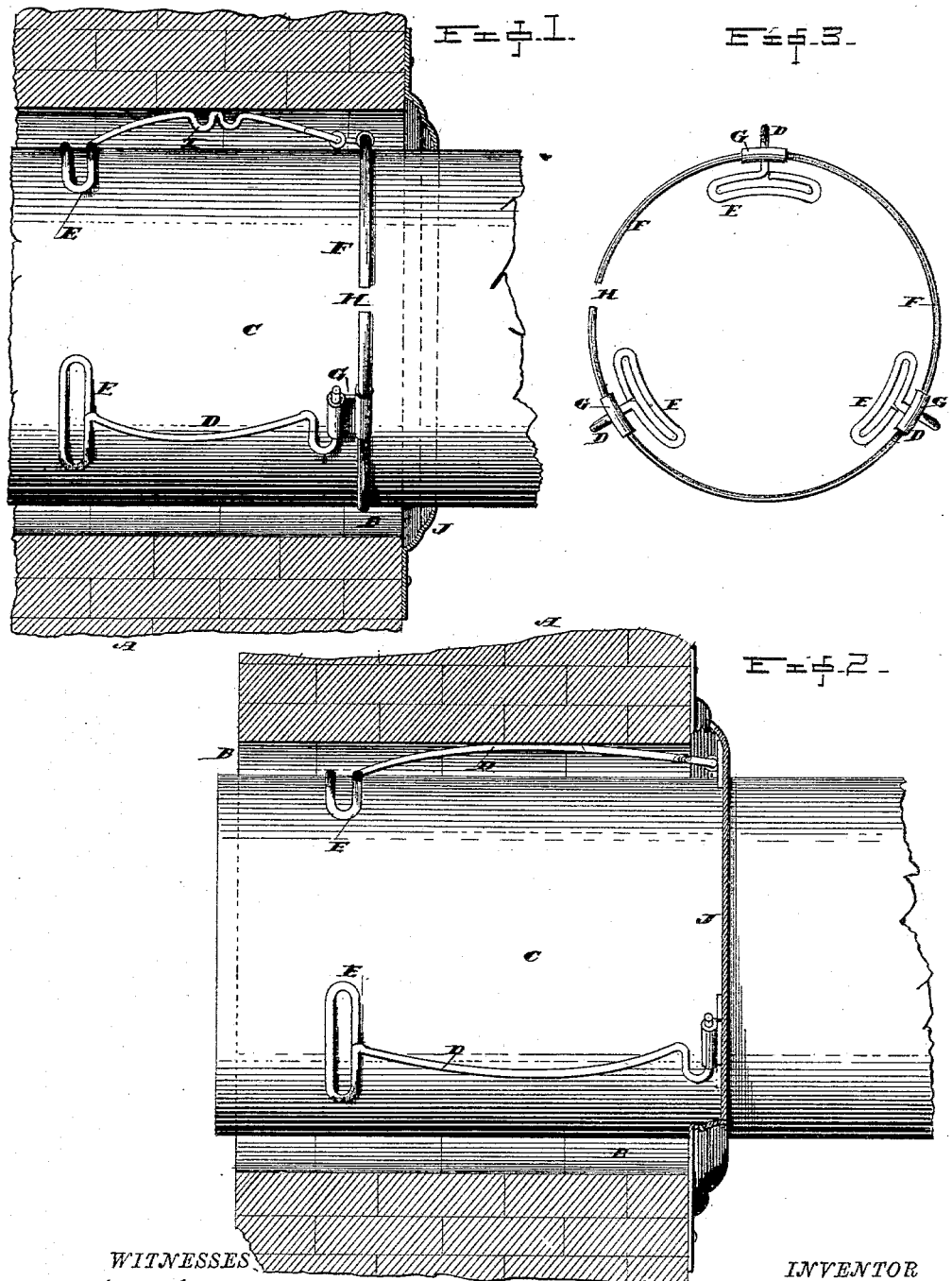
WITNESSES
INVENTOR
William S. Welsh
By H. A. Toulmin
his Attorney.

United States Patent Office.

WILLIAM S. WELSH, OF SPRINGFIELD, OHIO, ASSIGNOR OF ONE-HALF TO JOSEPH F. KURTIS, OF SAME PLACE.

STOVE-PIPE HOLDER.

SPECIFICATION forming part of Letters Patent No. 387,837, dated August 14, 1888.

Application filed December 3, 1887. Serial No. 256,843. (No model.)

*To all whom it may concern:*

Be it known that I, WILLIAM S. WELSH, a citizen of the United States, residing at Springfield, in the county of Clark and State of Ohio, have invented certain new and useful Improvements in Stove-Pipe Holders, of which the following is a specification, reference being had therein to the accompanying drawings.

This invention relates to improvements in stove-pipe holders, and is designed for the purpose of securing stove-pipes firmly in stove-pipe holes in the walls of buildings when such holes are larger than the pipes, as is frequently the case.

The invention consists of the peculiarities hereinafter appearing, and more fully pointed out in the claims.

In the accompanying drawings, forming a part of this specification, and on which like reference-letters designate corresponding parts, Figure 1 represents a side elevation of my improved stove-pipe holder, a portion of a pipe, and a section of a wall with the pipe-holder therein; Fig. 2, a similar view showing a modification in the means of securing the holding-bars, and Fig. 3 a detailed end view of the pipe-holder.

The letter A designates the wall of a building in which the usual stove-pipe hole, B, has been cut, and the letter C a section of the usual stove-pipe. It frequently happens that the hole in the wall is larger than the pipe. In fact, it is an exception when the pipe fits the hole, as different-sized pipes are from time to time applied to the pipe-hole by different occupants of the building. It is to secure the pipe under these circumstances in a strong and cheap manner in the pipe-hole, as already suggested, and also to sustain the pipe centrally in the hole and in a way which will allow of its being easily withdrawn, that my invention relates.

The letter D designates a rod or bar of iron or steel, curved so as to engage both the pipe and the pipe-hole when placed between them. This bar is bent into a segmental loop, E, at one end, so as to embrace the pipe, and at the other end is connected with a band, F, as by a clip, G. This band is preferably constructed of iron or steel wire and is open at H, so as to fit pipes of different sizes and to clamp itself upon them. I prefer to employ three of the bars D to constitute a set, though any convenient number may be used. I may also zigzag the bars, as shown at I in Fig. 1, to secure more points of contact with the wall of the pipe-hole, and hence more friction, whereby the pipe is more strongly held against displacement. It will be understood that the shape of the bars tends to make them bind upon the pipe and against the pipe-hole.

In Fig. 2 I have illustrated the bars as connected with the usual circular band or collar, J, which loosely fits the pipe and stands against the wall, to which it is secured or not, as may be desired.

It will be observed that when the bars are applied to the pipe and the pipe placed in the hole the bars enter the hole after the manner of a wedge and bind against both the pipe and the wall of the hole. The advantages of this simple device are obvious, for it will be seen that the pipe is held against working out of the hole, is secured in any set position, and is kept away from the walls of the hole, leaving an air-space and preventing liability of fire should the wall be of inflammable material.

I do not wish to be understood as confining myself to the shape of the bars shown, nor to other details, as my invention embraces more than these things, and extends to a device for securing stove-pipes in holes larger than themselves, in which bars are interposed between the pipe and hole and act frictionally to hold one within the other.

Having thus fully described my invention, what I claim as new, and desire to secure by Letters Patent, is—

1. A stove-pipe holder consisting of a detachable band or ring adapted to encircle a stove-pipe and clamp the outside thereof and a plurality of bars connected to such ring and extending radially from and back to the pipe, whereby said bars are adapted to engage the walls of a pipe-hole and to bear against the pipe when the latter is placed therein to secure the pipe to the hole.

2. A stove-pipe holder consisting of an open band or ring adapted to clamp round a stove-pipe, a plurality of clips secured to it, and a like number of curved spring-bars connected to the clips at one end and having segmental loops at the other end.

3. A stove-pipe holder consisting of a detachable band adapted to encircle a stove-pipe, and a plurality of yielding or spring bars connected to such band and extending radially from and back to the pipe, whereby said bars are adapted to engage the walls of the pipe-hole and bear against the pipe when the latter is placed in position with a constant pressure to secure the pipe in the hole.

In testimony whereof I affix my signature in presence of two witnesses.

WILLIAM S. WELSH.

Witnesses:
WILBER COLVIN,
A. A. YEATMAN.